United States Patent
Koseki et al.

(10) Patent No.: US 6,804,715 B1
(45) Date of Patent: Oct. 12, 2004

(54) SWITCH CONTROL APPARATUS, SWITCH CONTROL METHOD, AND A COMPUTER-READABLE RECORDING MEDIUM IN WHICH IS RECORDED A SWITCH CONTROL PROGRAM

(75) Inventors: Michihiko Koseki, Kawasaki (JP); Yoshihisa Chujo, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 821 days.

(21) Appl. No.: 09/653,357

(22) Filed: Aug. 31, 2000

(30) Foreign Application Priority Data

Dec. 28, 1999 (JP) .......................................... 11-375382

(51) Int. Cl.[7] .......................................... G06F 15/173
(52) U.S. Cl. .......................................... 709/224; 714/4
(58) Field of Search ....................... 714/11, 4; 718/105; 709/227, 224

(56) References Cited

U.S. PATENT DOCUMENTS

| | | | | |
|---|---|---|---|---|
| 6,145,094 A | * | 11/2000 | Shirriff et al. ................. | 714/11 |
| 6,401,121 B1 | * | 6/2002 | Yoshida et al. .............. | 709/227 |
| 6,539,494 B1 | * | 3/2003 | Abramson et al. .............. | 714/4 |
| 6,550,017 B1 | * | 4/2003 | Moiin et al. .................... | 714/4 |
| 6,560,717 B1 | * | 5/2003 | Scott et al. ...................... | 714/4 |
| 6,581,088 B1 | * | 6/2003 | Jacobs et al. ................ | 718/105 |

* cited by examiner

Primary Examiner—John Follansbee
Assistant Examiner—Jungwon Chang
(74) Attorney, Agent, or Firm—Staas & Halsey LLP

(57) ABSTRACT

The communications statuses of a plurality of clients are checked in a fixed cycle; when a check result corresponding to at least one of the clients is irregular, the estimated number of clients which will be able to receive communications services from an alternative server (standby server) after the server is switched from a main server (present server) to the alternative server is calculated based on all said check results; the calculated number of clients is compared with the number of clients which are receiving the communications services from the main server prior to the switch, and the appropriateness of the switch is determined based on the result of this comparison; the switch from the main server to the alternative server is controlled based on the result of the determination.

6 Claims, 7 Drawing Sheets

FIG.2

| NODE NAME | APPARATUS NAME | CLIENT COMMUNICATIONS STATUS FLAG |
|---|---|---|
| NODE 100 | CLIENT 120, MAIN SERVER 110 | $F_1$ |
| NODE 200 | CLIENT 220, ALTERNATIVE SERVER 210 | $F_2$ |
| NODE 300 | CLIENT 320 | $F_3$ |

T

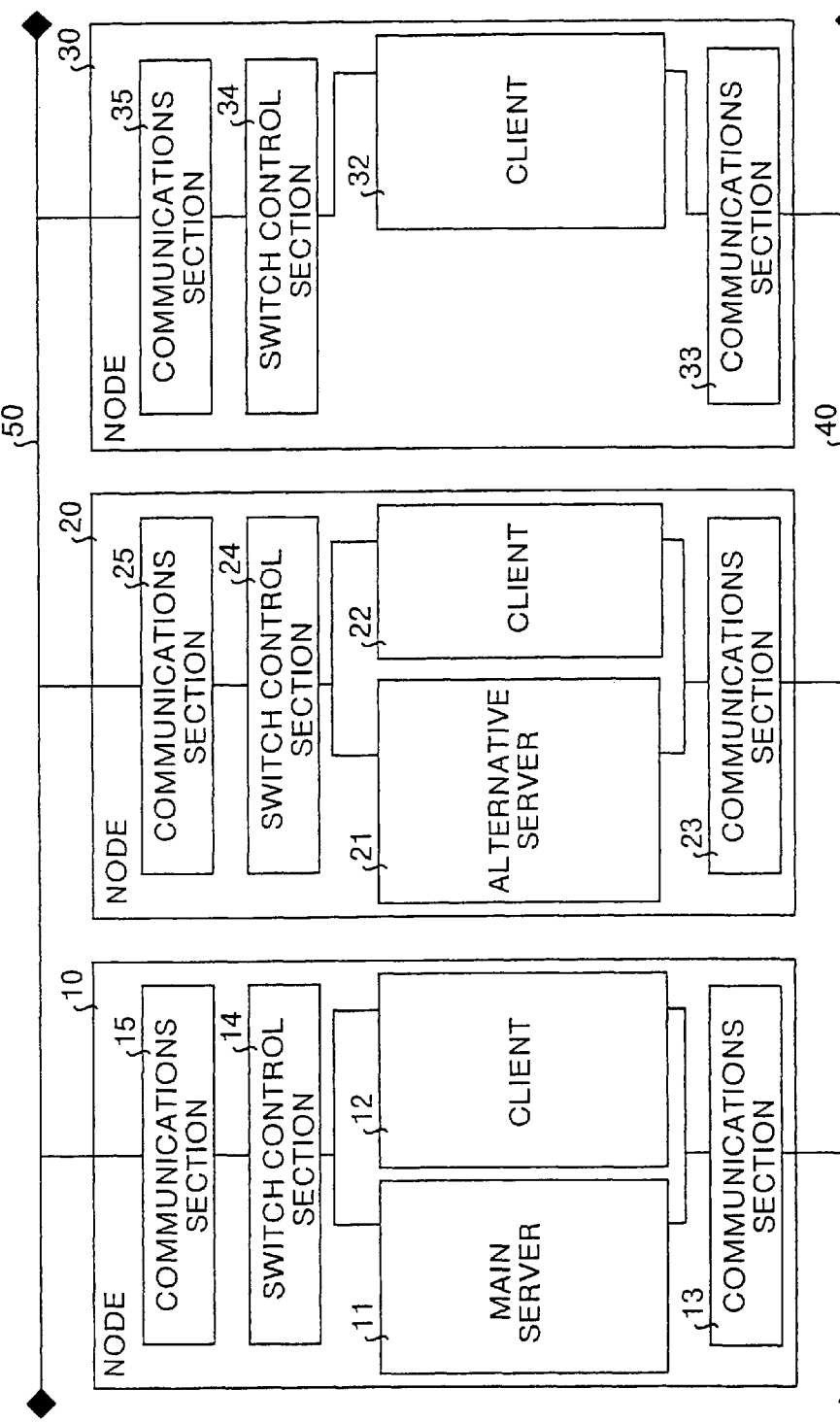

SWITCH CONTROL APPARATUS, SWITCH CONTROL METHOD, AND A COMPUTER-READABLE RECORDING MEDIUM IN WHICH IS RECORDED A SWITCH CONTROL PROGRAM

FIELD OF THE INVENTION

The present invention relates to a switch control apparatus used in switch control of a client/server system operating on a plurality of nodes which are mutually connected via a network, a switch control method, and a computer-readable recording medium in which is recorded a switch control program.

BACKGROUND OF THE INVENTION

Generally, a client/server system comprises at least two servers (main server and alternative server) having a series complex constitution, and a plurality of clients which are connected to the servers via a network. In such a client/server system, when a communications irregularity has been detected, the server providing the communications services to the clients is uniformly switched from the main server to the alternative server.

However, depending on the cause of the irregularity, the above switch control sometimes has the opposite effect of reducing the number of clients capable of receiving the communications services from the server. Consequently, there is a demand for an apparatus and a method to effectively solve this problem.

FIG. 7 is a block diagram showing the constitution of a conventional client/server system. In FIG. 7, nodes 10, 20 and 30 are mutually connected via a communications path for data 40 (communications path for control 50). A main server 11 and a client 12 operate in the node 10. An alternative server 21 and a client 22 operate in the node 20. A client 32 operates in the node 30.

In the node 10, the main server 11 supplies predetermined communications services to the clients 12, 22 and 32. The main server 11 functions as a present system server of the client/server system. The client 12 connects to the main server 11 and receives communications services therefrom during regular operation. When an irregularity occurs, the client 12 is able to switch from the main server 11 so as to receive communications services from the alternative server 21.

A communications section 13 is inserted between the main server 11 and the client 12 and the communications path for data 40, and controls communications between the main server 11 and the client 12 and the external nodes 20 and 30 in compliance with a predetermined communications protocol. A switch control section 14 controls the switching from the main server 11 to the alternative server 21. A communications section 15 is inserted between the switch control section 14 and the communications path for control 50, and controls communications between the switch control section 14 and the external nodes 20 and 30 in compliance with a predetermined communications protocol.

In the node 20, the alternative server 21 realizes the same functions as the main server 11, and provides the communications services instead of the main server 11 in the event of an irregularity. That is, the alternative server 21 functions as a standby server for the present server (the main server 11). Thus the conventional client/server system uses an in-series complex constitution comprising the main server 11 and the alternative server 21.

The client 22 receives communications services from the main server 11 during regular operation. When there is an irregularity, the client 22 is able to switch from the main server 11 so as to receive communications services from the alternative server 21. A communications section 23 is inserted between the alternative server 21 and the client 22 and the communications path for data 40, and controls communications between the alternative server 21 and the client 22 and the external nodes 10 and 30 in compliance with a predetermined communications protocol.

A switch control section 24 controls the switching from the main server 11 to the alternative server 21. A communications section 25 is inserted between the switch control section 24 and the communications path for control 50, and controls communications between the switch control section 24 and the external nodes 10 and 30 in compliance with a predetermined communications protocol.

In the node 30, the client 32 receives communications services from the main server 11 during regular operation. When there is an irregularity, the client 32 is able to switch from the main server 11 so as to receive communications services from the alternative server 21. A communications section 33 is inserted between the client 32 and the communications path for data 40, and controls communications between the client 32 and the external nodes 10 and 20 in compliance with a predetermined communications protocol.

A switch control section 34 controls the switching from the main server 11 to the alternative server 21. A communications section 35 is inserted between the switch control section 34 and the communications path for control 50, and controls communications between the switch control section 34 and the external nodes 10 and 20 in compliance with a predetermined communications protocol.

In the constitution described above, the main server 11 provides communications services in accordance with requests from the client 12 in the node 10, the client 22 in the node 20 and the client 32 in the node 30. The main server 11 provides the communications services to the client 12 in the same node 10. Furthermore, the main server 11 provides the communications services to the client 22 in the node 20 via the communications section 13, the communications path for data 40 and the communications section 23. Moreover, the main server 11 provides the communications services to the client 32 in the node 30 via the communications section 13, the communications path for data 40 and the communications section 33.

In addition to providing the communications services described above, the main server 11 checks the communications statuses (regular or irregular) of the clients 12, 22 and 32 at fixed intervals. Specifically, the clients 12, 22 and 32 each transmit a fixed-cycle communications packet to the main server 11 in a fixed cycle (e.g. every five seconds). This fixed-cycle communications packet comprises an address of the transmission destination main server 11, an address of the transmission source (the address of the clients 12, 22 and 32) and dummy data.

The main server 11 receives the fixed-cycle communications packets and deems a check result of the communications status of each client to be regular. In the case where no fixed-cycle communications packet is received from the client even when a predetermined period (e.g. thirty seconds) has elapsed from the time when the previous fixed-cycle communications packet was received, the main server 11 deems the check result of communications status of that client to be irregular.

When the communications section 23 in the node 20 breaks down, the main server 11 does not receive a fixed-cycle communications packet from the client 22. Therefore, the main server 11 deems the check result of the communications status of the client 22 to be irregular. In this case, the two clients 12 and 32 can receive the communications services from the main server 11, but the client 22 cannot.

The main server 11 notifies the switch control section 14 that the irregularity has been detected. The switch control section 14 switches access destination of the client 12 in the node 10 from the main server 11 to the alternative server 21. Furthermore, the switch control section 14 outputs a switch signal via the communications section 15, the communications path for control 50 and the communications section 25 to the switch control section 24 in the node 20, and outputs a switch signal via the communications section 15, the communications path for control 50 and the communications section 35 to the switch control section 34. As a consequence, the switch control sections 24 and 34 switch the access destinations of the clients 22 and 32 from the main server 11 to the alternative server 21.

After the switch, the alternative server 21 performs the function of providing the communications services to the clients 12, 22 and 32 instead of the main server 11. However, since there is an irregularity in the communications section 23 in the node 20, the client 12 in the node 10 and the client 32 in the node 30 cannot access the alternative server 21. On the other hand, the client 22 is able to access the alternative server 21 since the client 22 is in the same node there as (node 20). Therefore, after the switch, only the client 22 can receive the communications services from the alternative server 21.

As mentioned above, in the conventional client/server system, when an irregularity is detected in the communications statuses of the clients, the server providing the communications services to the clients is uniformly switched from the main server 11 to the alternative server 21.

However, when the communications section 23 has broken down as described above, although two clients (the clients 12 and 32) were able to receive the communications services prior to switching the server, only one client (the client 22) is able to receive the communications services after the switch. Consequently, the number of clients which can receive the communications services is reduced. It follows that it would be better not to switch the server in this case, since to do so would have the opposite effect of that intended.

SUMMARY OF THE INVENTION

It is an object of this invention to provide a switch control apparatus capable of preventing a reduction in the number of clients which can receive communications services due to switching the server, a switch control method, and a computer-readable recording medium in which is stored a switch control program.

In order to achieve the above objects, a first aspect of this invention provides a switch control apparatus for controlling a switch from a present server (corresponding to a main server 110 in the embodiment explained later), which provides communications services to a plurality of clients (corresponding to clients 120, 220 and 320 in an embodiment explained later) via a network (corresponding to a communications path for data 400 in the embodiment explained later), to a standby server (corresponding to an alternative server 210 in the embodiment explained later) which has the same functions as the present server. The switch control apparatus comprises a communications status checking unit (corresponding to a main server controller 111 in the embodiment explained later) which checks the communications status of each of said plurality of clients in a fixed cycle; a client number calculating unit (corresponding to the main server controller 111 in the embodiment explained later) which calculates the estimated number of clients which will be able to receive communications services from said standby server after the server is switched from said present server to said standby server based on all said check results in the case when a check result corresponding to at least one of the clients is irregular; and a control unit (corresponding to a switch control section 140 in the embodiment explained later) which determines whether switching is appropriate based on a comparison between a result calculated by said client number calculating unit and a number of clients which are receiving the communications services from said present server prior to switching, and controls switching from said present server to said standby server accordingly.

According to this invention, the communications status checking unit checks the communications status of each of the plurality of clients in a fixed cycle. When a communications status of at least one of the clients becomes irregular due to break down or the like, the client number calculating unit calculates the estimated number of clients which will be able to receive communications services from said standby server after the server is switched from said present server to said standby server based on all the check results.

Consequently, the control unit determines the appropriateness of the switching (whether or not to switch the server) by comparing the result (number of clients) calculated by said client number calculating unit with the number of clients which are receiving the communications services from said present server prior to switching (at present). When the control unit determines to switch (e.g. when the number of clients after switching will exceed the number of clients prior to switching), the server is switched from the present server to the standby server, whereby the standby server provides communications services to the plurality of clients.

On the other hand, when the control unit determines not to switch (e.g. when the number of clients after switching is less than the number of clients prior to switching), the control unit does not switch the server from the present server to the standby server, whereby the present server continues to provide communications services to the plurality of clients.

Thus, according to this invention, when the communications status of at least one of the clients has become irregular, the appropriateness of switching is determined based on a comparison between the result calculated by the client number counting unit and the number of clients which are receiving communications services from the present server prior to switching. Therefore, there is no unnecessary switching and the number of clients which can receive the communications services is not reduced by switching.

Furthermore, a second aspect of this invention comprises the switch control apparatus of the first aspect, wherein the control unit executes switching when said result calculated by said client number calculating unit has exceeded said number of clients which are receiving the communications services from said present server prior to switching.

According to this invention, the server is switched only when the communications status of at least one of the plurality of clients has become irregular, and the result calculated by said client number calculating unit has exceeded said number of clients which are receiving the communications services from said present server prior to switching. Therefore, there is no unnecessary switching and the number of clients which can receive the communications services is not reduced by switching.

Furthermore, a third aspect of this invention comprises the switch control apparatus of the first and second aspects, wherein the control unit does not perform switching in the case when said result calculated by said client number calculating unit is less than said number of clients which are receiving the communications services from said present server prior to switching.

According to this invention, the server is not switched when the communications status of at least one of the plurality of clients has become irregular and the result calculated by said client number calculating unit is less than said number of clients which are receiving the communications services from said present server prior to switching. Therefore, there is no unnecessary switching and the number of clients which can receive the communications services is not reduced by switching.

Furthermore, a fourth aspect of this invention comprises the switch control apparatus of any one of the first to third aspects, further comprising a service amount comparing unit (corresponding to the main server controller 111 in the embodiment explained later) which compares an amount of communications services which can be provided by said standby server with an amount of communications services which can be provided by said present server in the case when said result calculated by said client number calculating unit is the same as said number of clients which are receiving the communications services from said present server prior to switching; and the control unit determines whether switching is appropriate based on the result of the comparison performed by said service amount comparing unit, and controls switching accordingly.

According to this invention, even when said result calculated by said client number calculating unit is the same as said number of clients which are receiving the communications services from said present server prior to switching, the appropriateness of switching is determined based on a comparison between the amount of communications services which can be provided by said standby server and the amount of communications services which can be provided by said present server, and switching is controlled accordingly. Therefore, even when an irregularity has occurred, the quality of the communications service can be improved.

Furthermore, a fifth aspect of this invention comprises the switch control apparatus as described in the fourth aspect, wherein said control unit executes switching in the case where the amount of communications services which can be provided by said standby server exceeds the amount of communications services which can be provided by said present server, and does not execute switching in the case where the amount of communications services which can be provided by said standby server is equal to or less than the amount of communications services which can be provided by said present server.

According to this invention, the server is switched only when the amount of communications services which can be provided by said standby server exceeds the amount of communications services which can be provided by said present server. Therefore, even when an irregularity has occurred, a greater amount of communications services can be provided than prior to the irregularity.

Furthermore, a sixth aspect of this invention provides a switch control method for controlling a switch from a present server, which provides communications services to a plurality of clients via a network, to a standby server, which has the same functions as the present server, comprising the steps (corresponding to steps SA1 to SA2 in the embodiment explained later) of checking the communications status of each of said plurality of clients in a fixed cycle; calculating (corresponding to steps SA4 and SA6 in the embodiment explained later) the estimated number of clients which will be able to receive communications services from said standby server after the server is switched from said present server to said standby server based on all said check results in the case when a check result corresponding to at least one of the clients is irregular; and determining whether switching is appropriate based on a comparison between a result calculated in said step of calculating and a number of clients which are receiving the communications services from said present server prior to switching, and controlling switching from said present server to said standby server accordingly (corresponding to steps SA5, SA7, SA8 and SA10 in the embodiment explained later).

According to this invention, the communications statuses of the plurality of clients are checked in a fixed cycle in the step of checking the communications statuses. When a communications status of at least one of the clients becomes irregular due to break down or the like, the estimated number of clients which will be able to receive communications services from said standby server after the server is switched from said present server to said standby server is calculated based on all the check results in the step of calculating the client number.

Consequently, the appropriateness of the switching (whether or not to switch the server) is determined in the step of controlling by comparing the result (number of clients) calculated in the step of calculating the client number with the number of clients which are receiving the communications services from said present server prior to switching (at present). When switching is determined (e.g. when the number of clients after switching will exceed the number of clients prior to switching), in the step of controlling the server is switched from the present server to the standby server, whereby the standby server provides communications services to the plurality of clients.

On the other hand, when it is determined that the server is not to be switched (e.g. when the number of clients after switching is less than the number of clients prior to switching), in the step of controlling, the server is not switched from the present server to the standby server, and the present server continues to provide communications services to the plurality of clients.

Thus, according to this invention, when the communications status of at least one of the clients has become irregular, the appropriateness of switching is determined based on a comparison between the result calculated by the client number counting unit and the number of clients which are receiving communications services from the present server prior to switching. Therefore, there is no unnecessary switching and the number of clients which can receive the communications services is not reduced by switching.

Furthermore, a seventh aspect of this invention provides a computer-readable recording medium in which is stored a switch control program applied in a switch control apparatus for controlling a switch from a present server, which provides communications services to a plurality of clients via a network, to a standby server which has the same functions as the present server. The program allows a computer to execute the steps of checking the communications status of each of said plurality of clients in a fixed cycle (corresponding to steps SA1 to SA2 in the embodiment explained later); calculating the estimated number of clients which will be able to receive communications services from said standby server after the server is switched from said present server to said standby server based on all said check results in the case when a check result corresponding to at least one of the clients is irregular (corresponding to steps SA4 and SA6 in the embodiment explained later); and determining whether switching is appropriate based on a comparison between a result calculated in said step of calculating and a number of clients which are receiving the communications services from said present server prior to switching, and controlling switching from said present server to said standby server accordingly (corresponding to steps SA5, SA7, SA8 and SA10 in the embodiment explained later).

According to this invention, the communications statuses of the plurality of clients are checked in a fixed cycle in the step of checking the communications statuses. When a communications status of at least one of the clients becomes irregular due to break down or the like, the estimated number of clients which will be able to receive communications services from said standby server after the server is switched from said present server to said standby server is calculated based on all the check results in the step of calculating the client number.

Consequently, the appropriateness of the switching (whether or not to switch the server) is determined in the step of controlling by comparing the result (number of clients) calculated in the step of calculating the client number with the number of clients which are receiving the communications services from said present server prior to switching (at present). When switching is determined (e.g. when the number of clients after switching will exceed the number of clients prior to switching), in the step of controlling the server is switched from the present server to the standby server, whereby the standby server provides communications services to the plurality of clients.

On the other hand, when it is determined that the server is not to be switched (e.g. when the number of clients after switching is less than the number of clients prior to switching), in the step of controlling, the server is not switched from the present server to the standby server, and the present server continues to provide communications services to the plurality of clients.

Thus, according to this invention, when the communications status of at least one of the clients has become irregular, the appropriateness of switching is determined based on a comparison between the result calculated by the client number counting unit and the number of clients which are receiving communications services from the present server prior to switching. Therefore, there is no unnecessary switching and the number of clients which can receive the communications services is not reduced by switching.

Other objects and features of this invention will become understood from the following description with reference to the accompanying drawings.

BRIEF DESCRIPTION OF THE DRAWINGS

FIG. 2 is a diagram showing a node table T used in the embodiment;

FIG. 7 is a block diagram showing the constitution of a conventional client/server system.

DESCRIPTION OF THE PREFERRED EMBODIMENTS

Preferred embodiments of the switch control apparatus, the switch control method, and the computer-readable recording medium in which is stored a switch control program according to the present invention will be explained in detail with reference to the drawings.

Figure 1:
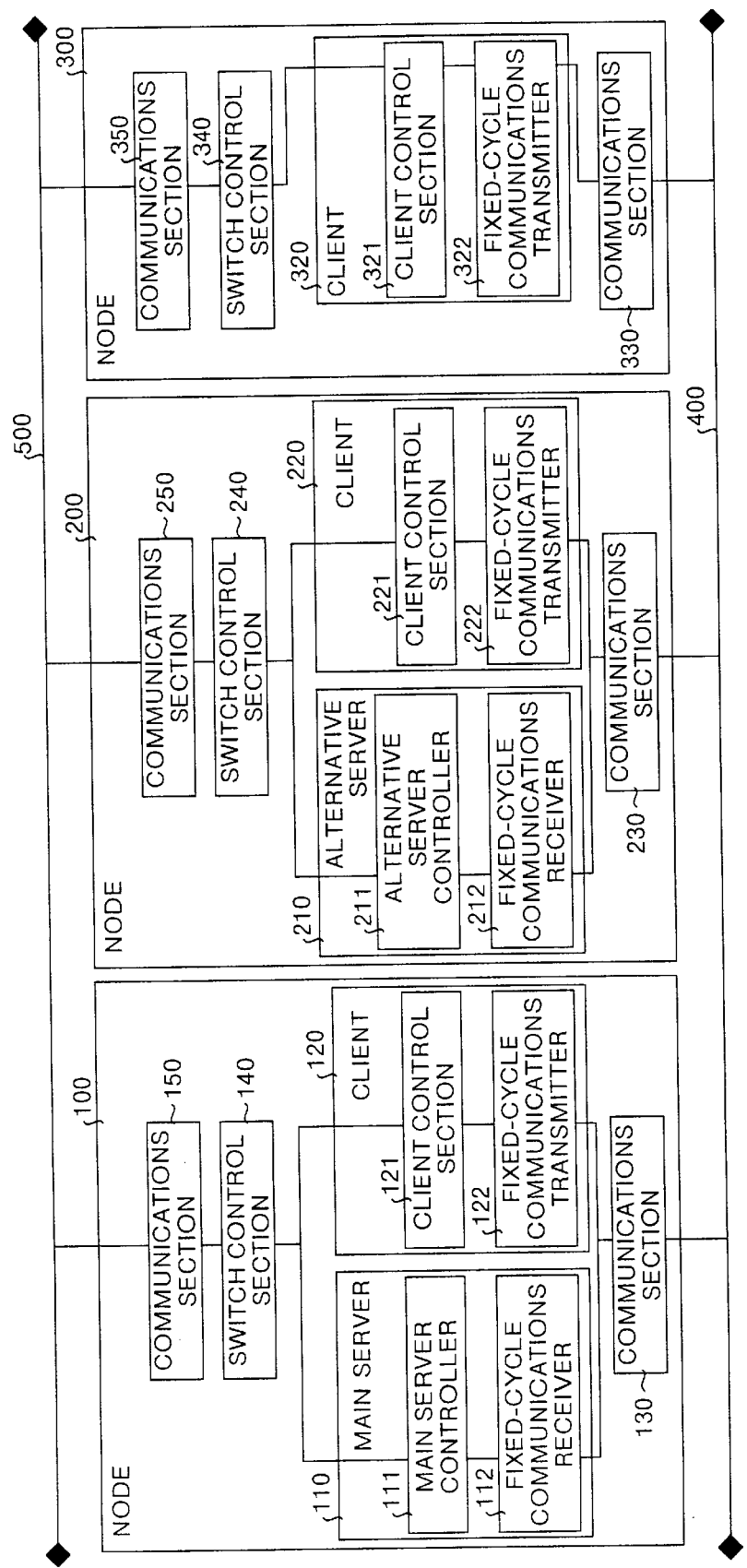
FIG. 1 is a block diagram showing the constitution of an embodiment of the present invention.

FIG. 1 is a block diagram showing the constitution of an embodiment. In FIG. 1, a client/server system has three nodes 100, 200 and 300. The nodes 100, 200 and 300 are mutually connected via a communications path for data 400 (communications path for control 500). A main server 110 and a client 120 operate in the node 100; an alternative server 210 and a client 220 operate in the node 200; and a client 320 operates in the node 300.

In the node 100, the main server 110 provides predetermined communications services to the clients 120, 220 and 320. The communications services comprise providing a variety of electronic information such as contents, information and data. The main server 110 functions as a present system server of the client/server system. In the main server 110, a main server control section 111 checks at fixed intervals the communications statuses (regular or irregular) of the clients 120, 220 and 320 which are the destinations for the communications services, and controls the provision of the communications services.

The main server control section 111 stores a node table T shown in FIG. 2. Based on this node table T, the main server control section 111 can learn which node an apparatus (client and server) is positioned in, in addition to the communications status (regular or irregular) of each client. In the node table T, the names of the nodes are recorded in a "node name" column, the names of the client (server) correspond to the address are recorded in a "apparatus name" column, and flags representing the communications statuses of the respective clients are recorded in a "client communications status flag" column.

More specifically, the record for the "node 100" ("node name") has "client 120" and "main server 110" as the "apparatus names" in the node 100, and "$F_1$" is recorded as the "client communications status flag". The client communications status flag $F_1$ is a flag representing the communications status (regular or irregular) of the client 120.

The record for the "node 200" ("node name") has "client 220" and "alternative server 210" in the node 200 as the "apparatus names", and "$F_2$" is recorded as the "client communications status flag". The client communications status flag $F_2$ is a flag representing the communications status (regular or irregular) of the client 220.

Similarly, the record for the "node 300" ("node name") has "client 320" in the node 300 as the "apparatus name", and "$F_3$" is recorded as the "client communications status flag". The client communications status flag $F_3$ is a flag representing the communications status (regular or irregular) of the client 320.

Returning to FIG. 1, a fixed-cycle communications receiver 112 in the main sever 110 receives a fixed-cycle communications packet PA shown in FIG. 3 at a fixed cycle (e.g. five seconds) from each of a fixed-cycle communications transmitter 122, a fixed-cycle communications transmitter 222 and a fixed-cycle communications transmitter 322, which will be explained later. The fixed-cycle communications packet PA is used to check the communications status (regular or irregular) of the client 120, the client 220 and the client 320. This check is performed by the main server control section 111.

Figure 3:
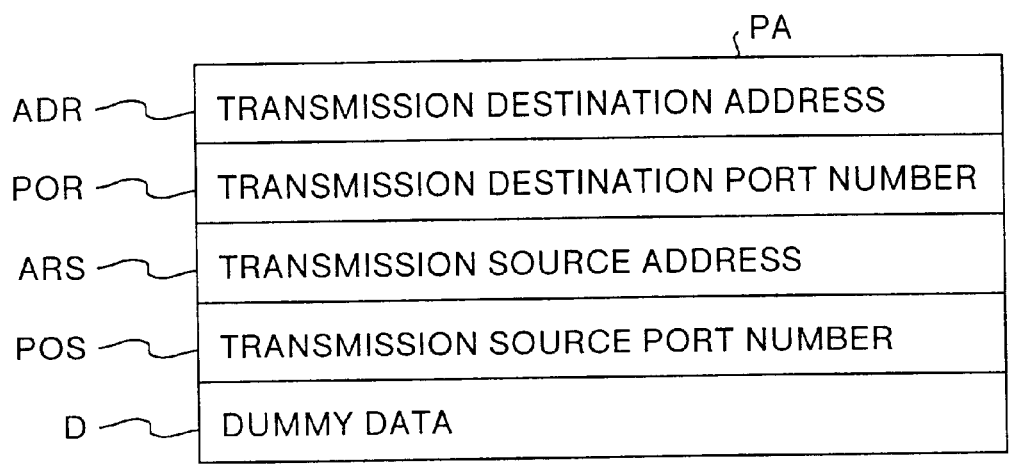
FIG. 3 is a diagram showing a data structure of a fixed-cycle communications packet PA used in the embodiment.

The fixed-cycle communications packet PA shown in FIG. 3 comprises a transmission destination address ADR, a transmission destination port number POR, a transmission source address ARS, a transmission source port number POS, and dummy data D. The transmission destination address ADR is the address of the transmission destination of the fixed-cycle communications packet PA (in this case, the main server 110). The transmission destination port number POR is the number of the network port of the transmission destination. The transmission source address ARS is the address of the transmission source of the fixed-cycle communications packet PA (in this case, the clients 120, 220 and 320). The transmission source port number POS is the number of the network port of the transmission source. The dummy data D is special data for checking the communications status.

Returning to FIG. 1, the client 120 is connected to the main server 110 in the node 100, and during normal operation receives communications services from the main server 110. When an irregularity occurs, the client 120 can receive the communications services from the alternative server 210 instead of the main server 110. The client 120 comprises a client control section 121 which controls the receiving of the communications services.

The fixed-cycle communications transmitter 122 transmits the fixed-cycle communications packet PA (see FIG. 3) to the fixed-cycle communications receiver 112 of the main server 110 in a fixed cycle (=five seconds). In this case, the fixed-cycle communications packet PA comprises the transmission destination address ADR (=the address of the main server 110), the transmission destination port number POR (=the network port number of the main server 110), the transmission source address ARS (=the address of the client 120), the transmission source port number POS (=the network port number of the client 120), and the dummy data D.

A communications section 130 is inserted between the main server 110 and the client 120 and the communications path for data 400, and controls communications between the main server 110 and the client 120 and the external nodes 200 and 300 in compliance with a predetermined communications protocol. A switch control section 140 controls the switch from the main server 110 to the alternative server 210. A communications section 150 is inserted between the switch control section 140 and the communications path for control 500, and controls communications between the switch control section 140 and the external nodes 200 and 300 in compliance with a predetermined communications protocol.

In the node 200, the alternative server 210 has the same function as the main server 110, and provides communications services instead of the main server 110 when an irregularity occurs. That is, the alternative server 210 functions as a standby server for the present server (the main server 110). Thus the client/server system of this embodiment has an inseries complex constitution comprising the main server 110 and the alternative server 210.

An alternative server control section 211 in the alternative server 210 has the same function as the main server control section 111. The alternative server control section 211 checks the communications status (regular or irregular) of each of the clients 120, 220 and 320 which are the destinations to which the communications services are provided, and controls the provision of the communications services.

The alternative server control section 211 holds the same node table T (shown in FIG. 2) as the main server controller 111. The alternative server control section 211 determines which node each apparatus (clients and servers) is positioned in, and determines the communications status (regular or irregular) of each client, based on the node table T.

When there is an irregularity, a fixed-cycle communications receiver 212 performs the same operation as the fixed-cycle communications receiver 112, receiving a fixed-cycle communications packet PA (see FIG. 3) at a fixed cycle (e.g. five seconds) from the fixed-cycle communications transmitter 122, the fixed-cycle communications transmitter 222 and the fixed-cycle communications transmitter 322. The communications status check is performed by the alternative server control section 211.

The client 220 is connected to the main server 110 in the node 100 via the communications section 230, the communications path for data 400 and the communications section 130. During regular operation, the client 220 receives communications services from the main server 110. When there is an irregularity, the client 220 can receive communications services from the alternative server 210 in the same node 200 instead of from the main server 110. A client control section 221 in the client 220 controls the receiving of the communications services.

The fixed-cycle communications transmitter 222 transmits the fixed-cycle communications packet PA (see FIG. 3) via the communications section 230, the communications path for data 400 and the communications section 130 to the fixed-cycle communications receiver 112 of the main server 110 in a fixed cycle (=five seconds). In this case, the fixed-cycle communications packet PA comprises the transmission destination address ADR (=the address of the main server 110), the transmission destination port number POR (=the network port number of the main server 110), the transmission source address ARS (=the address of the client 220), the transmission source port number POS (=the network port number of the client 220), and the dummy data D.

The communications section 230 is inserted between the alternative server 210 and the client 220 and the communications path for data 400, and controls communications between the alternative server 210 and the client 220 and the external nodes 100 and 300 in compliance with a predetermined communications protocol. A switch control section 240 controls the switch from the main server 110 to the alternative server 210. A communications section 250 is inserted between the switch control section 240 and the communications path for control 500, and controls communications between the switch control section 240 and the external nodes 100 and 300 in compliance with a predetermined communications protocol.

In the node 300, the client 320 is connected to the main server 110 in the node 100 via a communications section 330, the communications path for data 400 and the communications section 130. During regular operation, the client 320 receives communications services from the main server 110. When there is an irregularity, the client 320 can receive communications services from the alternative server 210 in the node 200 via the communications section 330, the communications path for data 400 and the communications section 230 instead of from the main server 110. A client control section 321 in the client 320 controls the receiving of the communications services.

The fixed-cycle communications transmitter 322 transmits the fixed-cycle communications packet PA (see FIG. 3) via the communications section 330, the communications path for data 400 and the communications section 130 to the fixed-cycle communications receiver 112 of the main server 110 in a fixed cycle (=five seconds). In this case, the fixed-cycle communications packet PA comprises the transmission destination address ADR (=the address of the main server 110), the transmission destination port number POR (=the network port number of the main server 110), the transmission source address ARS (=the address of the client 320), the transmission source port number POS (=the network port number of the client 320), and the dummy data D.

The communications section 330 is inserted between the client 320 and the communications path for data 400, and controls communications between the client 320 and the external nodes 100 and 200 in compliance with a predetermined communications protocol. A switch control section 340 controls the switch from the main server 110 to the alternative server 210. A communications section 350 is inserted between the switch control section 340 and the communications path for control 500, and controls communications between the switch control section 340 and the external nodes 100 and 200 in compliance with a predetermined communications protocol.

Subsequently, the operation of the first embodiment will be explained based on the flowcharts shown in FIGS. 4 to 6. In FIG. 1, the main server 110 provides the communications services in accordance with requests from the client 120 in the node 100, the client 220 in the node 200, and the client 320 in the node 300.

The main server 110 provides the communications services to the client 120 in the same node 100 there as. The main server 110 provides the communications to the client 220 in the node 200 via the communications section 130, the communications path for data 400 and the communications section 230. Moreover, the main server 110 provides the communications services to the client 320 in the node 300 via the communications section 130, the communications path for data 400 and the communications section 330.

Simultaneous to the communications services mentioned above, the fixed-cycle communications transmitter 122 of the client 120, the fixed-cycle communications transmitter 222 of the client 220 and the fixed-cycle communications transmitter 322 of the client 320 each transmit a fixed-cycle communications packet PA (see FIG. 3) to the main server 110 in a fixed cycle (e.g. five seconds). On the other hand, the main server controller 111 of the main server 110 checks the communications status (regular or irregular) of each of the clients 120, 220 and 320 at fixed intervals based on the fixed-cycle communications packet PA.

Figure 4:
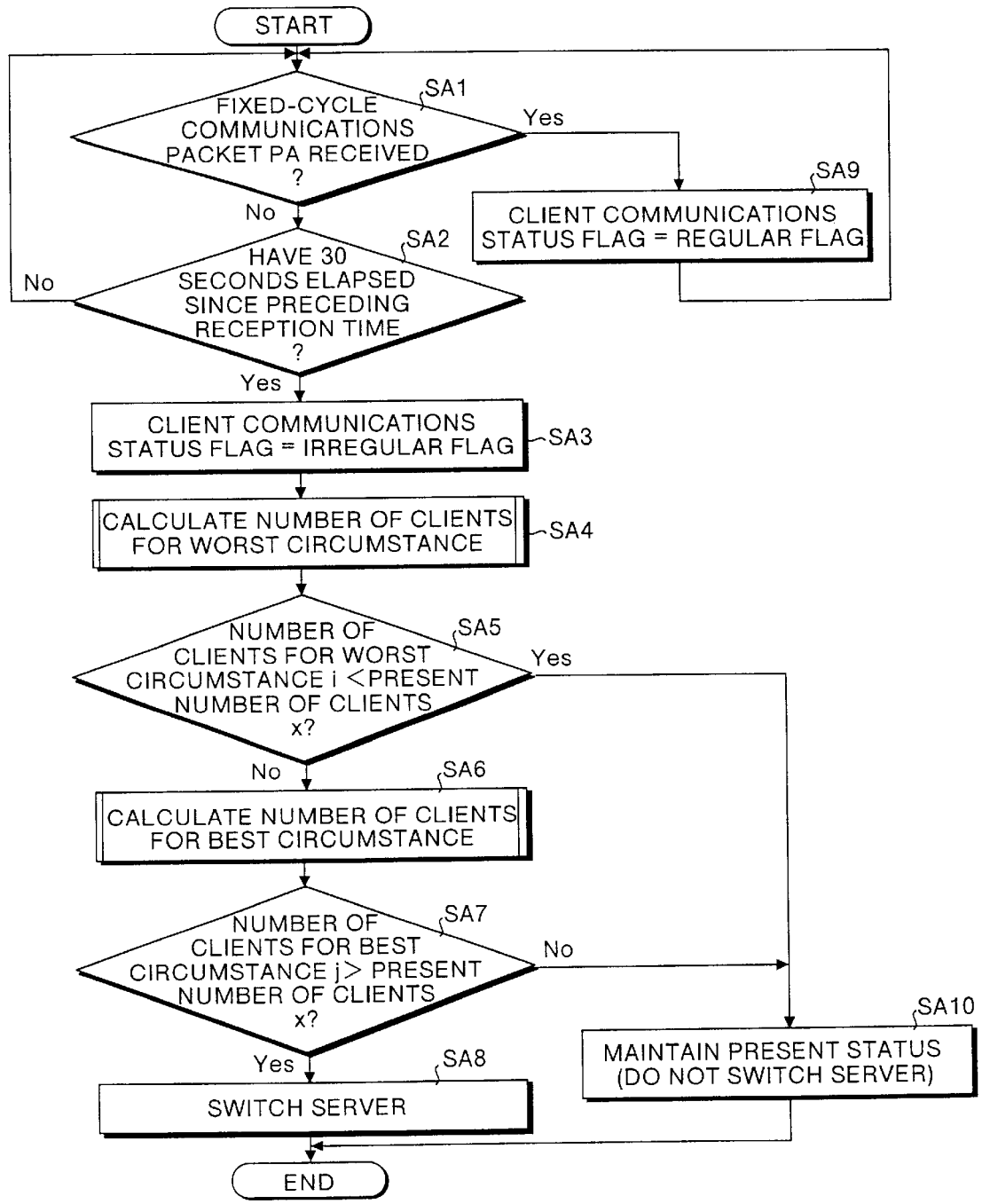
FIG. 4 is a flowchart showing the operation of the embodiment.

Specifically, in a step SA1 shown in FIG. 4 the main server controller 111 determines whether the fixed-cycle communications receiver 112 has received a fixed-cycle communications packet PA. Assuming in this case that the result of the determination is "No", in a step SA2 the main server controller 111 determines whether thirty seconds have elapsed since the preceding fixed-cycle communications packet PA was received. Assuming in this case that the result in the step SA2 is "No", the main server controller 111 repeats the above determination.

When the fixed-cycle communications receiver 112 has received the fixed-cycle communications packets PA from the fixed-cycle communications transmitter 122, the fixed-cycle communications transmitter 222 and the fixed-cycle communications transmitter 322, the main server controller 111 switches the result of the determination in the step SA1 to "Yes". In a step SA9, the main server controller 111 identifies each "apparatus name" (in this case, the client 120, the client 220 and the client 320) corresponding to the transmission source addresses ARS (see FIG. 3) of the fixed-cycle communications packets PA in the node table T shown in FIG. 2.

Then, the main server controller 111 changes the client communications status flags $F_1$ to $F_3$ in the node table T shown in FIG. 2 to regular flags. This signifies that the communications statuses of the clients 120, 220 and 320 are all regular.

Therefore, the clients 120, 220 and 320 receive the communications services from the main server 110. Thereafter, the main server controller 111 repeats the operation described above and changes the client communications status flags $F_1$ to $F_3$ to regular flags each time the fixed-cycle communications packets PA are received.

When the communications section 230 of the node 200 breaks down, the fixed-cycle communications receiver 112 of the main server 110 does not receive the fixed-cycle communications packet PA from the fixed-cycle communications transmitter 222 of the client 220. In the present case, it is assumed that thirty seconds have elapsed since the preceding fixed-cycle communications packet PA was received. Therefore, the main server controller 111 of the main server 110 makes the result of the determination in the step SA2 "Yes". The two clients 120 and 320 are able to receive the communications services from the main server 110 but the client 220 cannot.

In a step SA3, after identifying that the communications status of the client 220 is irregular (communications not possible), the main server controller 111 change the client communications status flag $F_2$ correspond to the client 220 in the node table T shown in FIG. 2 to an irregular flag. In a step SA4, the main server controller 111 calculates the number of clients for worst circumstance.

The number of clients for worst circumstance is the number of clients who can receive regular communications services from the alternative server 210 when the source which provides the communications services is switched from main server 110 to the alternative server 210, and represents the number of clients in the worst possible circumstance among the various communications environments which can be estimated from the client communications status flags $F_1$ to $F_3$ in the node table T.

Figure 5:
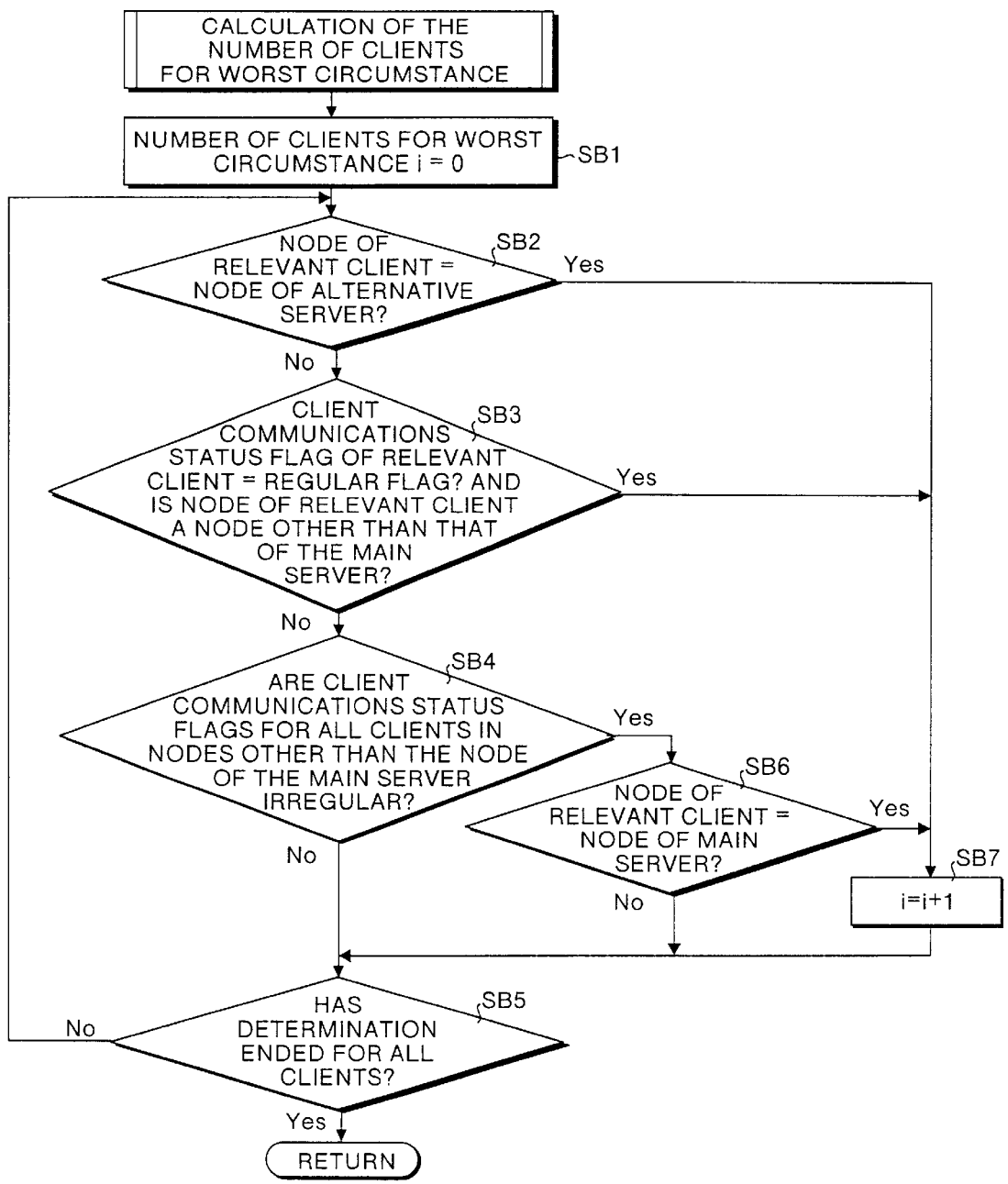
FIG. 5 is a flowchart showing a process of calculating number of clients for worst circumstance shown in FIG. 4.

More specifically, in a step SB1 shown in FIG. 5, the main server controller 111 inserts "0" as the initial value of the number of clients for worst circumstance i. In a step SB2, the main server controller 111 determines whether the node of a relevant client (client 120 in this case) matches the node 200 of the alternative server 210 by consulting the node table T shown in FIG. 2.

Here, "relevant client" signifies the client which is to be the object of the steps SB2 to SB6. In the step SB2, the main server controller 111 assumes that at least one of the clients in the node of the alternative server 210 is operating regularly after the switch from the main server 110 to the alternative server 210.

In this case, the node 100 of the client 120 and the node 200 of the alternative server 210 do not match, and therefore the main server controller 111 outputs "No" as the result in the step SB2. In a step SB3, the main server controller 111 determines whether the communications status flag of the relevant client is a regular flag, and whether the client is located in a different node from that of the main server 110.

In the present case, the client communications status flag $F_1$ (see FIG. 2) of the client 120 is a regular flag, but the node 100 of the client 120 is the same node 100 as that of the main server 110. Therefore, the main server controller 111 makes the result of the determination in step SB3 "No".

In a step SB4, the main server controller 111 determines whether the client communications status flags $F_2$ and $F_3$ relating to all the clients in nodes 200 and 300 other than the node 100 of the main server 110 (in this case the clients 220 and 320) are all irregular flags.

In this case, the client communications status flag $F_2$ is irregular but the client communications status flag $F_3$ is regular. Therefore, the main server controller 111 makes the result of the step SB4 "No". That is, it is determined that the client 120 will not be able to receive the communications services from the alternative server 210 after the switch from the main server 110 to the alternative server 210, and the client 120 is not included when counting the number of clients for worst circumstance i.

In a step SB5, the main server controller 111 determines whether the steps SB2 to SB6 have ended for all clients, the result in this case being "No". Consequently, the determination processes from the step SB2 onwards are carried out for the next client 220. In the step SB2, the main server controller 111 determines whether the node 200 of the client 220 matches the node 200 of the alternative server 210 by consulting the node table T shown in FIG. 2, the result in this case being "Yes".

In a step SB7, the main server 110 increases the number of clients for worst circumstance i to "1". In this case, it is determined that the client 220 will be able to receive the communications services from the alternative server 210 after the switch from the main server 110 to the alternative server 210, and the client 220 is included in counting the number of clients for worst circumstance i.

In the step SB5, the main server controller 111 determines whether the steps SB2 to SB6 have ended for all clients, the result in this case being "No". Consequently, the determination processes from the step SB2 onwards are carried out for the next client 320. In the step SB2, the main server controller 111 determines whether the node 300 of the client 320 matches the node 200 of the alternative server 210 by consulting the node table T shown in FIG. 2, the result in this case being "No".

In the step SB3, the main server controller 111 determines whether the client communications status flag $F_3$ (see FIG. 2) of the client 320 is a regular flag, and whether the node 300 of the client 320 is different from the node 100 of the main server 110. The result of the step SB3 in this case is "Yes".

In the step SB7, the main server controller 111 increases the number of clients for worst circumstance i to "2". In this case, it is determined that the client 320 will be able to receive the communications services from the alternative server 210 after the switch from the main server 110 to the alternative server 210, and the client 320 is therefore included in counting the number of clients for worst circumstance i. In the step SB5, the main server controller 111 outputs a result of "Yes".

When the result of the determination in the step SB4 is "Yes", the main server controller 111 determines whether the node of the relevant client is the same as the node 100 of the main server 110. In the case where the result is "Yes", the main server controller 111 increases the number of clients for worst circumstance i in the step SB7. On the other hand, in the case where the result of the step SB6 is "No", the main server controller 111 carries out the determination of the step SB5.

Returning to FIG. 4, in a step SA5, the main server controller 111 determines whether the number of clients for worst circumstance i (="2") which was calculated in the step SA4 is less than the present number of clients x. The present number of clients x is the number of clients which can presently (i.e. before switching to the alternative server 210) receive the communications services from the main server 110.

Specifically, the present number of clients x is the number of regular flags among the client communications status flags $F_1$ to $F_3$ in the node table T. Therefore, since the client communications status flags $F_1$ and $F_3$ are both regular flags, the present number of clients x is "2". In this case, the number of clients for worst circumstance i (="2") is equal to the present number of clients x (="2"). Therefore, the main server controller 111 outputs a result of "No" in the step SA5.

In the step SA6, the main server controller 111 calculates the number of clients for best circumstance. The number of clients for best circumstance is the number of clients which can receive regular communications services from the alternative server 210 when the source which provides the communications services is switched from main server 110 to the alternative server 210, and represents the number of clients in the best possible circumstance among the various communications environments which can be estimated from the client communications status flags $F_1$ to $F_3$ in the node table T.

Figure 6:
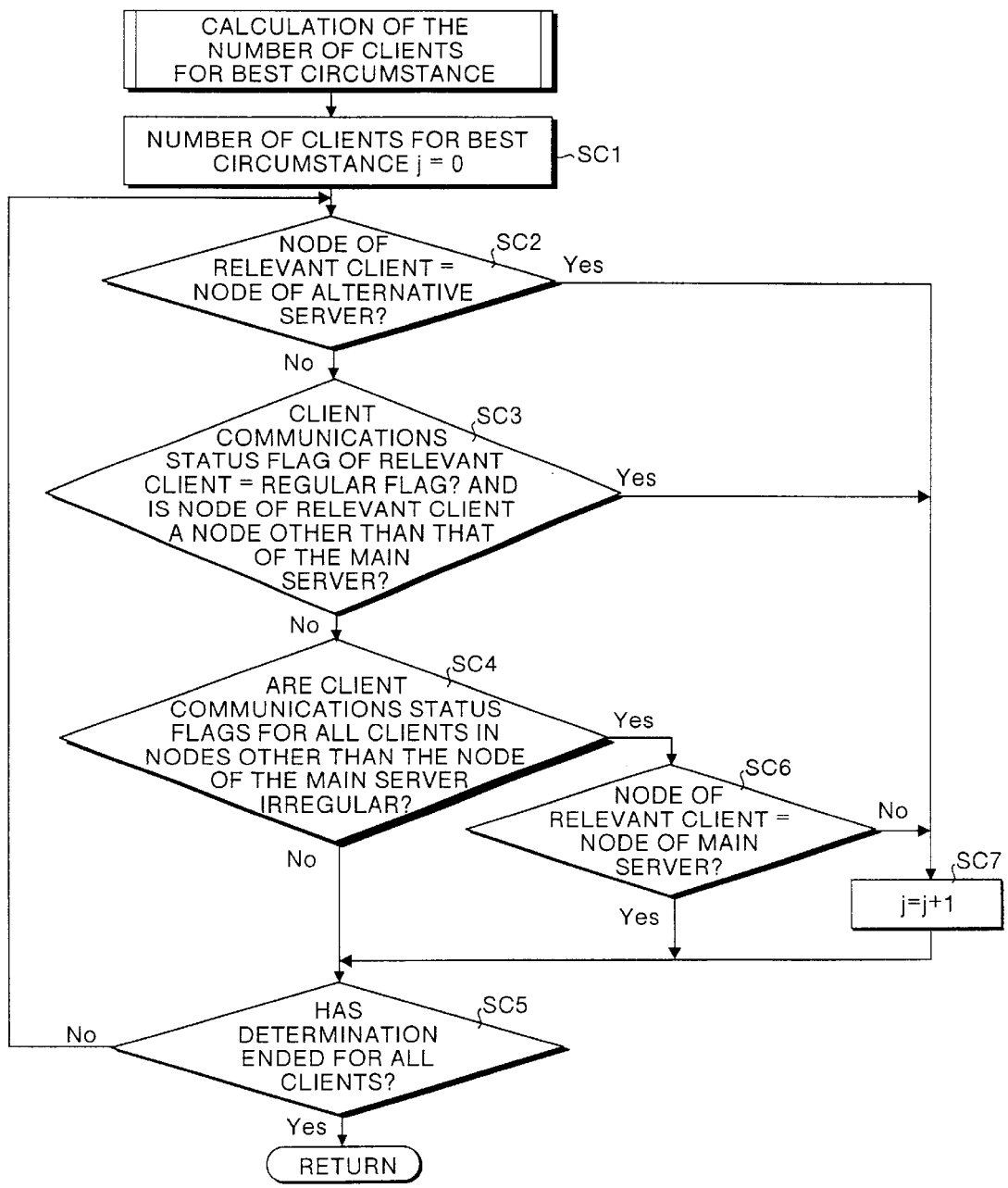
FIG. 6 is a flowchart showing a process of calculating a number of clients for best circumstance shown in FIG. 4.

In a step SC1 shown in FIG. 6, the main server controller 111 inserts "0" as the initial value of the number of clients for best circumstance j. The steps SC2 to SC5 shown in FIG. 6 correspond to the steps SB2 to SB5 shown in FIG. 5. Note that, in FIG. 6, the "Yes" and "No" results of the step SC6 are reverse to those of the step SB6 (see FIG. 5).

In the step SC2, the main server controller 111 determines whether the node of the client 120 matches the node 200 of the alternative server 210 by consulting the node table T shown in FIG. 2, the result in this case being "No". In the step SC3, the client communications status flag $F_1$ (see FIG. 2) of the client 120 is a regular flag, but the node 100 of the client 120 is the same as the node 100 of the main server 110. Therefore, in the step SC3 the main server controller 111 outputs a result of "No".

In the step SC4, the main server controller 111 determines that, of all the clients in the nodes 200 and 300 other than the node 100 of the main server 110 (in this case the clients 220 and 320), the client communications status flag $F_2$ is an irregular flag but the client communications status flag $F_3$ is an regular flag, and therefore the result is "No". That is, it is determined that the client 120 will not be able to receive the communications services from the alternative server 210 after the switch from the main server 110 to the alternative server 210, and consequently the client 120 is not counted among the number of clients for best circumstance j.

In a step SC5, the main server controller 111 determines whether the steps SC2 to SC6 have ended for all clients, the result in this case being "No". Consequently, the determination processes from the step SC2 onwards are carried out for the next client 220. In the step SC2, the main server controller 111 determines whether the node 200 of the client 220 matches the node 200 of the alternative server 210 by consulting the node table T shown in FIG. 2, the result in this case being "Yes".

In a step SC7, the main server controller 111 increases the number of clients for best circumstance j to "1". In this case, it is determined that the client 220 will be able to receive the communications services from the alternative server 210 after the switch from the main server 110 to the alternative server 210, and the client 220 is counted among the number of clients for best circumstance j.

In the step SC5, the main server controller 111 determines whether the steps SC2 to SC6 have ended for all clients, the result in this case being "No". Consequently, the determination processes from the step SC2 onwards are carried out for the next client 320. In the step SC2, the main server controller 111 determines whether the node 300 of the client 320 matches the node 200 of the alternative server 210 by consulting the node table T shown in FIG. 2, the result in this case being "No".

In the step SC3, the node 300 of the client 320 is different from the node 100 of the main server 110, and the client communications status flag $F_3$ (see FIG. 2) of the client 320 is a regular flag. Therefore, in the step SC3, the main server controller 111 outputs a result of "Yes". In the step SC7, the main server controller 111 increases the number of clients for best circumstance j to "2".

In this case, it is determined that the client 320 will be able to receive the communications services from the alternative server 210 after the switch from the main server 110 to the alternative server 210, and the client 320 is therefore counted among the number of clients for best circumstance j. In the step SC5, the main server controller 111 outputs a result of "Yes".

Returning to FIG. 4, in a step SA7, the main server controller 111 determines whether the number of clients for best circumstance j (="2") which was calculated in the step SA6 has exceeded the present number of clients x (="2"), the result in the present case being "No".

In a step SA10, the main server controller 111 does not output any signal to the switch control section 140. That is, the main server controller 111 maintains the present situation, wherein the communications is provided by the main server 110. Therefore, the switch control section 140 does not switch the main server 110 to the alternative server 210 in this case.

Subsequently, a case will be explained in which the communications section 130 of the node 100 breaks down. In this case, the fixed-cycle communications receiver 112 receives the fixed-cycle communications packet PA from the fixed-cycle communications transmitter 122 of the client 120. However, the fixed-cycle communications receiver 112 of the main server 110 no longer receives the fixed-cycle communications packets PA from the fixed-cycle communications transmitter 222 of the client 220 and the fixed-cycle communications transmitter 322 of the client 320.

Here it is assumed that thirty seconds have elapsed from the preceding reception. Therefore, the main server controller 111 of the main server 110 outputs a result of "Yes" in the step SA2. Now only one client 120 can receive the communications services from the main server 110. The other two clients 220 and 320 cannot receive the communications services.

In a step SA3, after identifying that the communications status of the client 220 and 320 is irregular (communications not possible), the main server controller 111 change the client communications status flags $F_2$ and $F_3$ corresponding to the client 220 and 320 in the node table T shown in FIG. 2 to irregular flags. In the step SA4, the main server controller 111 calculates the number of clients for worst circumstance by the same operation already described.

In the step SB1 shown in FIG. 5, the main server controller 111 inserts "0" as the initial value of the number of clients for worst circumstance i. In a step SB2, the main server controller 111 determines whether the node of the client 120 matches the node 200 of the alternative server 210 by consulting the node table T shown in FIG. 2. In this case, the result is "No" in the step SB2.

In a step SB3, the communications status flag $F_1$ (see FIG. 2) of the client 120 is a regular flag, but the node 100 of the client 120 is the same as the node 100 of the main server 110. Consequently, in the step SB3, the main server controller 111 outputs a result of "No".

In the step SB4, the main server controller 111 determines that the communications status flags $F_2$ and $F_3$ relating to all clients (clients 220 and 320) in the nodes 200 and 300 other than the node 100 are all irregular flags, and outputs a result of "Yes".

In the step SB6, the main server controller 111 determines whether the node 100 of the client 120 is the same as the node 100 of the main server 110, the result in this case being "Yes". In a step SB7, the main server controller 111 increases the number of clients for worst circumstance i to "1". In this case, it has been determined that the client 120 will be able to receive the communications services from the alternative server 210 after the switch from the main server 110 to the alternative server 210, and the client 120 has been counted among the number of clients for worst circumstance i.

In the step SB5, the main server controller 111 determines whether the steps SB2 to SB6 have ended for all clients, the result in this case being "No". Consequently, the determination processes from the step SB2 onwards are carried out for the next client 220. In the step SB2, the main server controller 111 determines whether the node 200 of the client 220 matches the node 200 of the alternative server 210 by consulting the node table T shown in FIG. 2, the result in this case being "Yes".

In the step SB7, the main server 110 increases the number of clients for worst circumstance i to "2". In this case, it is determined that the client 220 will be able to receive the communications services from the alternative server 210 after the switch from the main server 110 to the alternative server 210, and the client 220 is counted among the number of clients for worst circumstance i.

In the step SB5, the main server controller 111 determines whether the steps SB2 to SB6 have ended for all clients, the result in this case being "No". Consequently, the determination processes from the step SB2 onwards are carried out for the next client 320. In the step SB2, the main server controller 111 determines whether the node 300 of the client 320 matches the node 200 of the alternative server 210 by consulting the node table T shown in FIG. 2, the result in this case being "No".

In the step SB3, the node 300 of the client 320 is different from the node 100 of the main server 110, but the client communications status flag $F_3$ (see FIG. 2) of the client 320 is a regular flag. Therefore, the main server controller 111 outputs a result of "No" in the step SB3. In the step SB4, the main server controller 111 determines that the communications status flags $F_2$ and $F_3$ relating to all clients (client 220 and client 320) in the nodes 200 and 300 other than the node 100 are both irregular flags, and outputs a result of "Yes".

In the step SB6, the main server controller 111 determines whether the node 300 of the client 320 is the same as the node 100 of the main server 110, the result in this case being "No". In this case, it has been determined that the client 320 will not be able to receive the communications services from the alternative server 210 after the switch from the main server 110 to the alternative server 210, and the client 320 has not been counted among the number of clients for worst circumstance i. In the step SB5, the main server controller 111 outputs a result of "Yes."

Returning to FIG. 4, in the step SA5, the main server controller 111 determines whether the number of clients for worst circumstance i (="2") which was calculated in the step SA4 is less than the present number of clients x. Since only the client communications status flag $F_1$ is a regular flag, the present number of clients x is "1".

The number of clients for worst circumstance i (="2") is greater than the present number of clients x (="1"). Therefore, the main server controller 111 outputs a result of "No" in the step SA5, since it has been determined that switching from the main server 110 to the alternative server 210 would increase the number of clients which are able to receive the communications services.

In the step SA6, the main server controller 111 calculates the number of clients for best circumstance. In the step SC1 shown in FIG. 6, the main server controller 111 inserts "0" as the initial value of the number of clients for best circumstance j. In the step SC2, the main server controller 111 determines whether the node of the client 120 matches the node 200 of the alternative server 210 by consulting the node table T shown in FIG. 2, the result in this case being "No".

In the step SC3, the client communications status flag $F_1$ (see FIG. 2) of the client 120 is a regular flag, but the node 100 of the client 120 is the same as the node 100 of the main server 110. Therefore, in the step SC3 the main server controller 111 outputs a result of "No".

In the step SC4, the client communications status flags $F_2$ and $F_3$ relating to all the clients in the nodes 200 and 300 other than the node 100 of the main server 110 (the clients 220 and 320) are both irregular flags, and therefore the main server controller 111 outputs a result of "Yes".

In the step SC6, the main server controller 111 determines whether the node 100 of the client 120 matches the node 100 of the main server 110, the result here being "Yes". It is determined that the client 120 will not be able to receive the communications services from the alternative server 210 after the switch from the main server 110 to the alternative server 210, and consequently the client 120 is not counted among the number of clients for best circumstance j.

In the step SC5, the main server controller 111 determines whether the steps SC2 to SC6 have ended for all clients, the result in this case being "No". Consequently, the determination processes from the step SC2 onwards are carried out for the next client 220. In the step SC2, the main server controller 111 determines whether the node 200 of the client 220 matches the node 200 of the alternative server 210 by consulting the node table T shown in FIG. 2, the result in this case being "Yes".

In the step SC7, the main server controller 111 increases the number of clients for best circumstance j to "1". In this case, it is determined that the client 220 will be able to receive the communications services from the alternative server 210 after the switch from the main server 110 to the alternative server 210, and consequently the client 220 is counted among the number of clients for best circumstance j.

In the step SC5, the main server controller 111 determines whether the steps SC2 to SC6 have ended for all clients, the result in this case being "No". Consequently, the determination processes from the step SC2 onwards are carried out for the next client 320. In the step SC2, the main server controller 111 determines whether the node 300 of the client 320 matches the node 200 of the alternative server 210 by consulting the node table T shown in FIG. 2, the result in this case being "No".

In the step SC3, the node 300 of the client 320 is different from the node 100 of the main server 110, but the client communications status flag $F_3$ (see FIG. 2) of the client 320 is an irregular flag. Therefore, in the step SC3, the main server controller 111 outputs a result of "No". In the step SC4, the client communications status flags $F_2$ and $F_3$ relating to all the clients in the nodes 200 and 300 other than the node 100 of the main server 110 (the clients 220 and 320) are both irregular flags, and therefore the main server controller 111 outputs a result of "Yes".

In the step SC6, the main server controller 111 determines whether the node 300 of the client 320 is the same as the node 100 of the main server 110, the result in this case being "No". In the step SC7, the main server controller 111 increases the number of clients for best circumstance j to "2".

In this case, it is determined that the client 320 will be able to receive the communications services from the alternative server 210 after the switch from the main server 110 to the alternative server 210, and the client 320 is therefore counted among the number of clients for best circumstance j. In the step SC5, the main server controller 111 outputs a result of "Yes".

Returning to FIG. 4, in the step SA7, the main server controller 111 determines whether the number of clients for best circumstance j (="2") which was calculated in the step SA6 has exceeded the present number of clients x (="1"), the result in the present case being "Yes". A process to switch the server is carried out in a step SA8. That is, the main server controller 111 notifies the switch control section 140 of the switch.

As a consequence, the switch control section 140 switches the access destination of the client 120 in the node 100 from the main server 110 to the alternative server 210. Furthermore, the switch control section 140 outputs a switch signal via the communications section 150, the communications path for control 500 and the communications section 250 to the switch control section 240 in the node 200, and outputs a switch signal via the communications section 150, the communications path for control 500 and the communications section 350 to the switch control section 340. Consequently, the switch control section 240 and the switch control section 340 switch the access destinations of the client 220 and the client 320 from the main server 110 to the alternative server 210.

After the switch, the alternative server 210 provides the communications services to the two clients 220 and 320. The client 120 cannot receive the communications services from the alternative server 210 since the communications section 130 has broken down. In this case, the switch is used effectively, increasing the number of clients which can receive the communications services from the alternative server 210 from one to two.

According to the embodiment described above, when the communications status of at least one of the clients 120, 220 and 320 has become irregular, it is determined whether switching is appropriate by comparing the calculated number of clients for worst circumstance i and the number of clients for best circumstance j with the number of clients receives the communications services from the main server 110 prior to the switch. Since the switch is controlled based on the result of this determination, there is no unnecessary switching and the number of clients which can receive the communications services is not reduced by the switch.

An embodiment of this invention was described in detail above using the drawings, but the specific constitution is not limited to this embodiment and includes various design modifications and the like which do not exceed the scope of the invention. For example, in the embodiment already described, a switch control program for realizing the switching function may be recorded in a computer-readable recording medium, the switch being controlled by allowing a computer to read and execute the switch control program recorded in the recording medium.

The computer comprises a CPU which executes the above-mentioned switch control program, input apparatuses such as a keyboard and a mouse, a ROM (Read Only Memory) which stores various types of data, a RAM (Random Access Memory) which stores computation parameters and the like, a reading apparatus which reads the switch control program from the recording medium, output apparatuses such as a display and a printer, and a bus which connects all the sections of the apparatuses.

After reading the switch control program recorded in the recording medium via the reading apparatus, the CPU executes the switch control program, thereby controlling the switch as described above. The recording medium may comprise a transportable recording medium such as an optical disk, a floppy disk and a hard disk, and also a transmission medium which can momentarily hold data in the manner of a network.

A modification of the embodiment is possible wherein, when the number of clients for best circumstance j is the same as the present number of clients x in the step SA7 (see FIG. 4), the main server controller 111 compares the amount of communications services which the alternative server 210 can provide with the amount of communications services which the main server 110 can provide, and determines whether switching is appropriate based on the result of this comparison.

For example, in the case where the amount of communications services which the alternative server 210 can provide is greater than the amount of communications services which the main server 110 can provide, it is determined that switching is necessary and the switch control section 140 switches the server. On the other hand, in the case where the amount of communications services which the alternative server 210 can provide is equal to or less than the amount of communications services which the main server 110 can provide, it is determined that switching is unnecessary and the switch control section 140 does not switch the server.

According to this modification of the embodiment, the server is only switches when the amount of communications services which the alternative server 210 can provide is greater than the amount of communications services which the main server 110 can provide. Therefore, even when an irregularity has occurred, a greater amount of communications services can be provided than the amount prior to the irregularity, thereby improving the quality of the communications service.

As described above, according to the first aspect of the invention, when the communications status of at least one of the clients has become irregular, the appropriateness of switching is determined based on a comparison between the result calculated by the client number counting unit and the number of clients which are receiving communications services from the present server prior to switching. Therefore, there is no unnecessary switching and the number of clients which can receive the communications services is not reduced by switching.

Furthermore, according to the second aspect of this invention, the server is switched only when the communications status of at least one of the plurality of clients has become irregular, and the result calculated by said client number calculating unit has exceeded said number of clients which are receiving the communications services from said present server prior to switching. Therefore, there is no unnecessary switching and the number of clients which can receive the communications services is not reduced by switching.

Furthermore, according to the third aspect of this invention, the server is not switched when the communications status of at least one of the plurality of clients has become irregular and the result calculated by said client number calculating unit is less than said number of clients which are receiving the communications services from said present server prior to switching. Therefore, there is no unnecessary switching and the number of clients which can receive the communications services is not reduced by switching.

Furthermore, according to the fourth aspect of this invention, even when said result calculated by said client number calculating unit is the same as said number of clients which are receiving the communications services from said present server prior to switching, the appropriateness of switching is determined based on a comparison between the amount of communications services which can be provided by said standby server and the amount of communications services which can be provided by said present server, and switching is controlled accordingly. Therefore, even when an irregularity has occurred, the quality of the communications service can be improved.

Furthermore, according to the fifth aspect of this invention, the server is switched only when the amount of communications services which can be provided by said standby server exceeds the amount of communications services which can be provided by said present server. Therefore, even when an irregularity has occurred, a greater amount of communications services can be provided than prior to the irregularity.

Furthermore, according to the sixth and seventh aspects of this invention, when the communications status of at least one of the clients has become irregular, the appropriateness of switching is determined based on a comparison between the result calculated by the client number counting unit and the number of clients which are receiving communications services from the present server prior to switching. Therefore, there is no unnecessary switching and the number of clients which can receive the communications services is not reduced by switching.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A switch control apparatus for controlling a switch from a present server, which provides communications services to a plurality of clients via a network, to a standby server which has same functions as those of the present server, comprising:

a communications status checking unit which checks a communications status of each of said plurality of clients in a fixed cycle to obtain communication status check results for all the clients;

a client number calculating unit which calculates, based on the communication status check results, a first number of clients which will be able to receive communications services from said standby server after said present server is switched to said standby server, if one of the communication status check results corresponding to one of the clients is irregular; and a control unit which switches from said present server to said standby server when the calculated first number of clients is larger than a second number of clients that are receiving the communications services from said present server prior to switching by the control unit.

2. The switch control apparatus according to claim 1, wherein said control unit does not switch the present sever to the standby server when the calculated first number of clients is less than the second number of clients.

3. The switch control apparatus according to claim 1, further comprising a service amount comparing unit which compares a first amount of communications services which can be provided by said standby server with a second amount of communications services which can be provided by said present server, if the first number of clients is equal to the second number of clients; and said control unit switches from said present server to said standby server when the first amount of communication services is larger than the second amount of communication services.

4. The switch control apparatus according to claim 3, wherein said control unit does not switch the Present server to the standby server, if the first amount of communication services is equal to or less than the second amount of communication services.

5. A switch control method of controlling a switch from a present server, which provides communications services to a plurality of clients via a network, to a standby server, which has same functions as those of the present server, comprising:

checking a communications status of each of said plurality of clients in a fixed cycle to obtain communication check results for all the clients;

calculating, based on the communication status check results, a first number of clients which will be able to receive communications services from said standby server after said present server is switched to said standby server, if one of the communication status check results corresponding to one of the clients is irregular; and switching from said present server to said standby server when the calculated first number of clients is larger than a second number of clients that are receiving the communications services from said present server prior to switching.

6. A computer-readable recording medium in which is stored a switch control program applied in a switch control apparatus for controlling a switch from a present sever, which provides communications services to a plurality of clients via a network, to a standby server which has same functions as those of the present server, said program allowing a computer to execute:

checking a communications status of each of said plurality of clients in a fixed cycle to obtain communication status check results for all the clients;

calculating, based on the communication status check results, a first number of clients which will be able to receive communications services from said standby server after said present server is switched to said standby server, if one of the communication status check results corresponding to one of the clients is irregular; and switching from said present server to said standby server when the first number of clients is larger than a second number of clients that are receiving the communications services from said present server prior to switching.

* * * * *

UNITED STATES PATENT AND TRADEMARK OFFICE
CERTIFICATE OF CORRECTION

PATENT NO. : 6,804,715 B1
DATED : October 12, 2004
INVENTOR(S) : Michihiko Koseki et al.

It is certified that error appears in the above-identified patent and that said Letters Patent is hereby corrected as shown below:

Column 21,
Line 20, change "sever" to -- server --.
Line 35, change "Present" to -- present --.

Column 22,
Line 20, change "sever" to -- server --.

Signed and Sealed this

Eighth Day of March, 2005

JON W. DUDAS
*Director of the United States Patent and Trademark Office*